(12) United States Patent
Kaesser et al.

(10) Patent No.: US 11,621,471 B2
(45) Date of Patent: Apr. 4, 2023

(54) RESONATOR WITH A DIELECTRIC ELEMENT INCLUDING FIRST AND SECOND CHAMBERS THEREIN CONNECTED BY A CHANNEL, WHEREIN A LIQUID CRYSTAL HAVING AN ADJUSTABLE LEVEL FILLS THE FIRST AND SECOND CHAMBERS AND THE CHANNEL

(71) Applicant: Tesat-Spacecom GmbH & Co. KG, Backnang (DE)

(72) Inventors: Tobias Kaesser, Backnang (DE); Michael Franz, Backnang (DE)

(73) Assignee: Tesat-Spacecom GmbH & Co. KG

( * ) Notice: Subject to any disclaimer, the term of this patent is extended or adjusted under 35 U.S.C. 154(b) by 1030 days.

(21) Appl. No.: 16/378,691

(22) Filed: Apr. 9, 2019

(65) Prior Publication Data

US 2019/0315499 A1 Oct. 17, 2019

(30) Foreign Application Priority Data

Apr. 17, 2018 (DE) .................... 10 2018 109 054.4

(51) Int. Cl.
*H01P 7/06* (2006.01)
*B64G 1/58* (2006.01)
(Continued)

(52) U.S. Cl.
CPC ............... *H01P 7/06* (2013.01); *B64G 1/58* (2013.01); *H01P 7/10* (2013.01); *B64G 1/1007* (2013.01)

(58) Field of Classification Search
CPC .... H01P 7/06; H01P 7/00; H01P 7/088; H01P 11/008
(Continued)

(56) References Cited

U.S. PATENT DOCUMENTS 5,986,526 A    11/1999  Kopal et al.
10,468,734 B2 * 11/2019  Kaesser ............... H01P 7/06
(Continued)

FOREIGN PATENT DOCUMENTS

DE   10 2016 107 955 A1   11/2017
EP        3 240 102 A1   11/2017
WO       2007/028458 A1    3/2007

OTHER PUBLICATIONS

Franke et al., "Tunable Ka-band waveguide resonators and a small band band-pass filter based on liquid crystals," Proceeings of the 44th European Microwave Conference (Oct. 6-9, 2014) Rome, Italy, p. 339-342.

*Primary Examiner* — Benny T Lee
(74) *Attorney, Agent, or Firm* — Lerner, David, Littenberg, Krumholz & Mentlik, LLP

(57) ABSTRACT

A dielectric element for a resonator and a corresponding resonator are described. The dielectric element has a first chamber and a second chamber, which are fluidically connected to one another by a connecting channel. A liquid crystal is contained in the first chamber, a gas is contained in the second chamber. Changes in the volume of the liquid crystal can be compensated by a change in the volume of the gas, because the liquid crystal can move in the connecting channel. Consequently, such a resonator can be exposed to greatly fluctuating temperature ranges without requiring any further compensation for temperature-induced changes in the volume of the liquid crystal. The dielectric element can also be hermetically closed to complete the production process.

14 Claims, 4 Drawing Sheets

(51) Int. Cl.
*H01P 7/10* (2006.01)
*B64G 1/10* (2006.01)

(58) Field of Classification Search
USPC .......................................................... 333/231
See application file for complete search history.

(56) References Cited

U.S. PATENT DOCUMENTS 10,790,570 B2 * 9/2020 Kaesser ................... H03H 9/46
2017/0317662 A1 11/2017 Kaesser

* cited by examiner

RESONATOR WITH A DIELECTRIC ELEMENT INCLUDING FIRST AND SECOND CHAMBERS THEREIN CONNECTED BY A CHANNEL, WHEREIN A LIQUID CRYSTAL HAVING AN ADJUSTABLE LEVEL FILLS THE FIRST AND SECOND CHAMBERS AND THE CHANNEL

FIELD OF THE INVENTION

The present invention relates to a dielectric element for adapting the resonant frequency of a resonator, to a resonator with such a dielectric element, the resonator being in particular a high-frequency resonator, and also to a frequency filter that has such a resonator.

BACKGROUND OF THE INVENTION

Resonators and frequency filters (filters for short) may use a dielectric, the permittivity of the dielectric can be adapted to give a resonant frequency or mid-frequency in the resonator. This involves using an electrical control field, which is generated for example by means of an electrode structure.

When such resonators are used in satellites, the resonators are sometimes subjected to great temperature fluctuations of 100 K or more in outer space. These temperature fluctuations have the effect that, on account of their coefficients of thermal expansion, the components used possibly expand or contract to different extents.

DE 10 2016 107 955 A1 and EP 3 240 102 A1 describe a resonator with a dielectric container that is filled with a liquid crystal.

BRIEF SUMMARY OF THE INVENTION

Aspects of the present invention may provide an improved compensation for volume fluctuations in a dielectric element with a liquid crystal for an adjustable resonator.

According to one aspect, a dielectric element for adapting the resonant frequency of a resonator is provided. The dielectric element comprises a container with a first chamber, a second chamber, and a connecting channel, which fluidically connects the first chamber to the second chamber. The first chamber is filled with a liquid crystal and a surface level of the liquid crystal is located in the connecting channel. The second chamber is filled with a gas, so that, when there is a temperature-induced change in the volume of the liquid crystal, the surface level in the connecting channel moves in the direction of the second chamber or away from the second chamber.

Liquid crystal materials have a dielectric constant that can be controlled. In this way, a filter for example on a satellite in space can be detuned in mid-frequency if the resonators are (partly) filled with liquid crystal material. This is very advantageous. In this case, however, the property of the liquid crystal of having a high coefficient of thermal expansion, which in particular may be higher than the coefficient of thermal expansion of the materials used for the dielectric element, in particular higher than the coefficient of thermal expansion of the material of the container, must be compensated by additional measures.

Especially in the case of applications in outer space, the temperature of technical components fluctuates considerably, because the absence of atmosphere means that a heat transfer can only take place by thermal conduction or thermal radiation, but not by thermal convection. If, for example, a satellite is radiated directly by the sun, the components in the satellite heat up greatly. It is conversely the case that the temperature drops very sharply in the shade of a celestial body. Apart from these external heat sources, the components can also heat up as a result of power dissipated during operation of the components.

The container is produced from a certain material and this material has a coefficient of thermal expansion. Similarly, the liquid crystal has a certain coefficient of thermal expansion. Typically, the coefficients of thermal expansion of the container and of the liquid crystal differ. This has the effect that the container and the liquid crystal expand or contract to different extents when there are high temperature fluctuations. Typically, the liquid crystal has a coefficient of thermal expansion that is higher than the coefficient of thermal expansion of the container. During heating, the liquid crystal has for example a thermally induced linear expansion of 200 ppm/K. Furthermore, liquid crystal is incompressible or substantially incompressible. The material of the container has for example a thermally induced linear expansion of 70 ppm/K. This thermally induced linear expansion has the effect that, with rising temperatures, the pressure in the container can rise significantly. In order to avoid damage to the container, a compensating device is helpful.

Known compensating devices with variable volume may be connected to the cavity of the container such that liquid crystal can flow out of the cavity of the container into the compensating device or vice versa when the volume of the liquid crystal changes as a result of thermal influences. However, such a compensating device requires a certain installation space and must additionally also be connected fluid-tightly to the cavity of the container. In order to eliminate the aspects associated with the compensating device, it is proposed in the present case to compensate for the compensation resulting from different coefficients of thermal expansion of the container and the liquid crystal by the construction with two chambers, one of which contains the liquid crystal and the other of which contains a gas.

The container is produced from a material that is transparent to high-frequency electromagnetic fields and has low losses for high-frequency electromagnetic fields, and similarly is distinguished by low outgassing rates for aerospace applications. Such a material may be a crosslinked polystyrene, which is for example sold under the trade-name Rexolite.

For the purposes of this description, liquid crystals refer to substances which, although liquid, also have directionally dependent physical properties such as are known from crystals. For the dielectric element, low molecular weight liquid crystals or liquid-crystalline polymers or elastomers may be used for example.

In particular, the first chamber is filled completely with the liquid crystal, so that no other fluid (another liquid or even a gas) is contained in the first chamber. There is even so much liquid crystal in the container that the connecting channel contains a liquid crystal column which extends in the connecting channel from the first chamber in the direction of the second chamber. This means that a surface level of the liquid crystal, that is to say the surface of the liquid crystal column, is located in the connecting channel.

The filling level of the container with liquid crystal is preferably set such that, at the lowest temperature to be expected in Earth orbit or in outer space, the surface level is still in the connecting channel. This means that, even at the lowest temperature to be expected, no gas enters the first chamber.

Also preferably, the filling level with liquid crystal and also the geometrical design of the connecting channel are set such that the surface level at the highest temperature to be expected during the operation of the dielectric element is likewise located in the connecting channel, that is to say does not run over into the second chamber.

The connecting channel is designed such that the surface tension and wetting effects of the liquid crystal prevent any mixing with the gas. When there is expansion of the volume of the liquid crystal (for example when there is a temperature rise), the surface level of the liquid crystal moves as a closed surface in the direction of the second chamber. Conversely, the surface level moves back in the direction of the first chamber when the volume of the liquid crystal reduces as a result of a falling temperature. This prevents gas from getting into the first chamber. This is because the gas getting into the first chamber could have a disadvantageous influence on the frequency properties of the resonator. Rather, it is desired that in the first chamber there is exclusively liquid crystal.

The gas in the second chamber is compressible and yields to the movement of the surface level of the liquid crystal in both directions. Even when the pressure changes within the container under a fluctuating temperature, as a result of the compressibility of the gas these pressure changes are comparatively small and instances of damage to the container are unlikely.

According to one embodiment, a coefficient of thermal expansion of the liquid crystal is higher than a coefficient of thermal expansion of the container, so that the temperature-induced change in the volume of the liquid crystal is compensated by a change in the volume of the gas.

The compressibility of the gas therefore compensates for the incompressibility of the liquid crystal even when the volume of the liquid crystal changes, for example due to thermal influences. The container can therefore be designed as a closed system, which eliminates the risk of leakages and the escape of liquid crystal at connecting points with compensating containers.

According to a further embodiment, the connecting channel has a smaller cross section than a cross section of the first chamber and a smaller cross section than a cross section of the second chamber.

The connecting channel may have a cross-sectional area of less than 1 mm$^2$. For example, the cross-sectional area may lie between 0.2 mm$^2$ and 0.9 mm$^2$, in particular between 0.2 mm$^2$ and 0.5 mm$^2$. In the case of a circular cross section, the range of 0.2 mm$^2$ and 0.5 mm$^2$ corresponds to a radius of between 0.25 mm and 0.4 mm (in each case including these range limits).

Such a cross-sectional area may contribute to the surface level of the liquid crystal remaining a closed surface even when there are changes in volume and to avoiding any mixing of liquid crystal with gas. Consequently, gas is prevented from penetrating into the first chamber.

The texture of an inner surface of the connecting channel may likewise contribute to keeping the surface level closed by wetting effects and avoiding any mixing with gas. For example, the inner surface may have a certain roughness, which can contribute to the surface level not being broken at the points of contact of the surface level and the inner surface.

The term "roughness" is understood in the present case as meaning in particular the mean roughness depth $R_z$. The mean roughness depth is a mean value of individual roughness depths over five successive measuring lengths in the profile of the surface concerned, i.e., the inner surface of the connecting channel. For each measuring length, a so-called "surface span" is determined. This is the distance spanning the highest point and the lowest point of the profile in a measuring length. In order to determine the mean roughness depth $R_z$, the differences of the surface spans of the five successive measuring lengths are averaged (added and then divided by five). The measuring lengths are preferably of the same length and follow one another in direct succession on the inner surface of the connecting channel.

The inner surface may have a mean roughness depth (roughness for the purposes of this description) of between 5 μm and 15 μm, including the end values. Preferably, the mean roughness depth is 8 to 12 μm, more preferably 9 to 11 μm and still more preferably 10 μm.

According to a further embodiment, a volume of the connecting channel is smaller than a volume of the first chamber and smaller than a volume of the second chamber.

The connecting channel is merely intended to allow for fluctuations in the volume of the liquid crystal. As long as a doubling of the volume of the liquid crystal is not to be expected, it is therefore sufficient if the volume of the connecting channel is smaller than the volume of the first chamber. In principle, however, it is also conceivable that the connecting channel has a volume that is the same size as the volume of the first chamber or even greater.

In one embodiment, the connecting channel may be longer (the length corresponds to the extent in the longitudinal direction or along the longitudinal axis of the container) than the first chamber.

According to a further embodiment, a separating element, which is movable along a longitudinal axis of the container in the connecting channel and is arranged between the liquid crystal and the gas, is arranged in the connecting channel.

The separating element is formed such that the separating element lies against the inner surface of the connecting channel in a circumferential and fluid-sealing manner and is placed on the liquid crystal like a float. If the volume of the liquid crystal expands, the separating element in the connecting channel moves or is pushed in the direction of the second chamber. If the liquid crystal contracts, the pressure imbalance between the first chamber and the second chamber has the effect that the separating element is moved in the direction of the first chamber.

According to a further embodiment, a membrane is arranged in the connecting channel and is connected in a fluid-tight manner to an inner surface of the connecting channel. The membrane comprises a fluid-impermeable and elastic material and is arranged on the surface level of the liquid crystal, so that the membrane compensates for a temperature-induced change in the volume of the liquid crystal by a movement or elastic deformation in the connecting channel in the direction of the second chamber or away from it.

The membrane may for example be fastened on the inner surface of the connecting channel in a circumferential manner. This fastening may be an adhesive attachment. However, it is also conceivable that the membrane is held on the inner surface by way of a clamping connection. It is also conceivable that the membrane is folded around a ring and the ring presses the edges of the membrane against the inner surface and keeps it in position.

The separating element and also the membrane may be used in a connecting channel with a smaller cross section or a smaller cross-sectional area than the first and second chambers. In principle, the separating element and the membrane may however also be used in a connecting channel that has a cross section or cross-sectional area of the same size or even greater than the first and second chambers.

The container is preferably a rotationally symmetrical cylinder. The first chamber, the connecting channel and the second chamber may have a circular cross section. Other cross-sectional forms are conceivable and possible. A circular cross section has the advantage, however, that the chambers and also the connecting channel can be easily produced by a drill with a corresponding diameter.

According to a further embodiment, the first chamber is closed at a first end face of the container by a first cover and the second chamber is closed at a second end face of the container by a second cover.

Accordingly, the liquid crystal and the gas can be filled into the corresponding chambers and/or the connecting channel before the closing of the respective end faces. The fact that the container has a closable opening at both end faces means that each chamber can be filled individually, even if the separating element or the membrane is arranged in the connecting channel before the filling of the chambers.

After the filling of the chambers, the chambers are closed at the corresponding end face by the associated cover.

It goes without saying that it is possible that the first chamber, the connecting channel and the second chamber are produced in the manner of a blind hole. The volumes of the first chamber, the connecting channel and the second chamber may be referred to as the interior space. In this case, the container only requires one cover to close the interior space. The liquid crystal may then be filled into the lower chamber of the interior space (the chamber remote from the opening of the container) for example with a suitable filling device. For example, a thin tube may extend through the connecting channel into the lower chamber and the liquid crystal may be injected until the desired filling height is reached.

According to a further embodiment, both the first cover and the second cover are adhesively bonded to the container.

The first cover and the second cover are fixed on the container such that the entire structure is suitable for use in a vacuum and no liquid escapes from the first chamber or the second chamber. The two covers may be connected to the container in a substance-bonding or material-bonding manner. In one variant, the covers are welded to the container. This may be performed with or without adding a welding filler.

According to a further embodiment, the gas in the second chamber is air. Therefore, a gas mixture consisting of a number of different substances may be contained in the second chamber. However, gases or gas mixtures other than air may also be used. In particular, such gases or gas mixtures that are gaseous (and consequently compressible) under the expected operating conditions or temperatures may be used.

It is only for the sake of completeness that it is pointed out that, when a gas is referred to in this description, the term "gas" also always includes a gas mixture.

According to a further aspect, a resonator for a frequency filter is provided. The resonator has a resonator housing, in which a resonator space is formed, and a dielectric element as described herein. The dielectric element is arranged such that the container is at least partially arranged in the resonator space or extends into the resonator space.

Consequently, as a dielectric element with a variable dielectric constant or permittivity, the container may serve and be used for adapting the resonant frequency or mid-frequency of the resonator.

According to one embodiment, the container is formed as a rod and is arranged in the resonator housing such that the container protrudes from an inner wall of the resonator housing into the resonator space, the connecting channel and the second chamber being located outside the resonator space.

In other words, only the first chamber filled with liquid crystal is located in the resonator space, so that the first chamber can be used to adjust the permittivity of the resonator. The closed surface level of the liquid crystal prevents air from penetrating into the region of the container that is located in the resonator space. Air bubbles in the region of the container that is located in the resonator space may have disadvantageous effects on the frequency setting of the resonator.

The properties of the resonator and of the dielectric element can be summarized as follows: the construction is generally very simple (easy-to-produce parts and simple constructing and connecting techniques). Especially the adhesive attachment of the cover or the two covers on the vessel is made much easier because the surfaces to be adhesively attached can be easily cleaned before the adhesive attachment. There is no longer the necessity for an additional compensating element. The construction is well suited for use in a high temperature range, because the gas present in the second chamber is compressed according to the internal pressure prevailing in the container.

The container is not completely filled with liquid crystal, but instead an air bubble is left therein. The air bubble does not change its position in relation to the liquid crystal, otherwise the air bubble would erratically disturb the high-frequency properties of the resonator or filter (for example by changing the dielectric constant to which the high-frequency field is exposed, depending on whether or where precisely the air bubble or parts thereof happen to be in the field-filled volume). The air bubble is positioned such that it makes the final closure of the container possible in an easy way. The air bubble is compressible, and therefore suitable for allowing (compensating) for the thermal expansion of the volume of the liquid crystal and keeping the resultant overly high and low pressures in the container so small as to not represent any danger to the container.

When the container is heated, it is possible to observe that the surface level of the liquid crystal rises in a way corresponding to the thermal expansion thereof; when the container is cooled, the surface level of the liquid crystal retracts again. In particular, this principle also works when the container is inverted (air bubble at the bottom, liquid crystal at the top, directional indications relating to the direction of a gravitational vector), so that the force of the weight actually acts counter to the desired effect. Even over the course of numerous temperature changes, the liquid crystal (or parts thereof) does not flow down into the chamber intended for the air. Even under mechanical loads, such as those that usually occur during the launch of a satellite, the liquid crystal stays in its position. The mechanical loads are, in particular, mechanical vibration (repeated pulses of movement) and mechanical shock (high one-off load).

According to a further aspect, a frequency filter is provided. The frequency filter has at least one resonator as described herein.

The frequency filter may be an Input Multiplexer ("IMUX") filter for a communication system of a communications satellite. The frequency filter may be used in the high-frequency range, for example in the range of several GHz to several 10 GHz or in the usual frequency bands for satellite communication.

According to a further aspect, a satellite is provided. The satellite contains at least one frequency filter as described herein.

According to one embodiment, the satellite is a communications satellite and the frequency filter is arranged in a transmission link to a remote station.

DETAILED DESCRIPTION OF THE INVENTION

There follows a description of an exemplary embodiment of the present invention with reference to the figures and described in the detailed description. It should be noted that elements that are the same or similar are identified in the figures by the same reference designations. The representations in the figures are schematic and not to scale.

Figure 1:
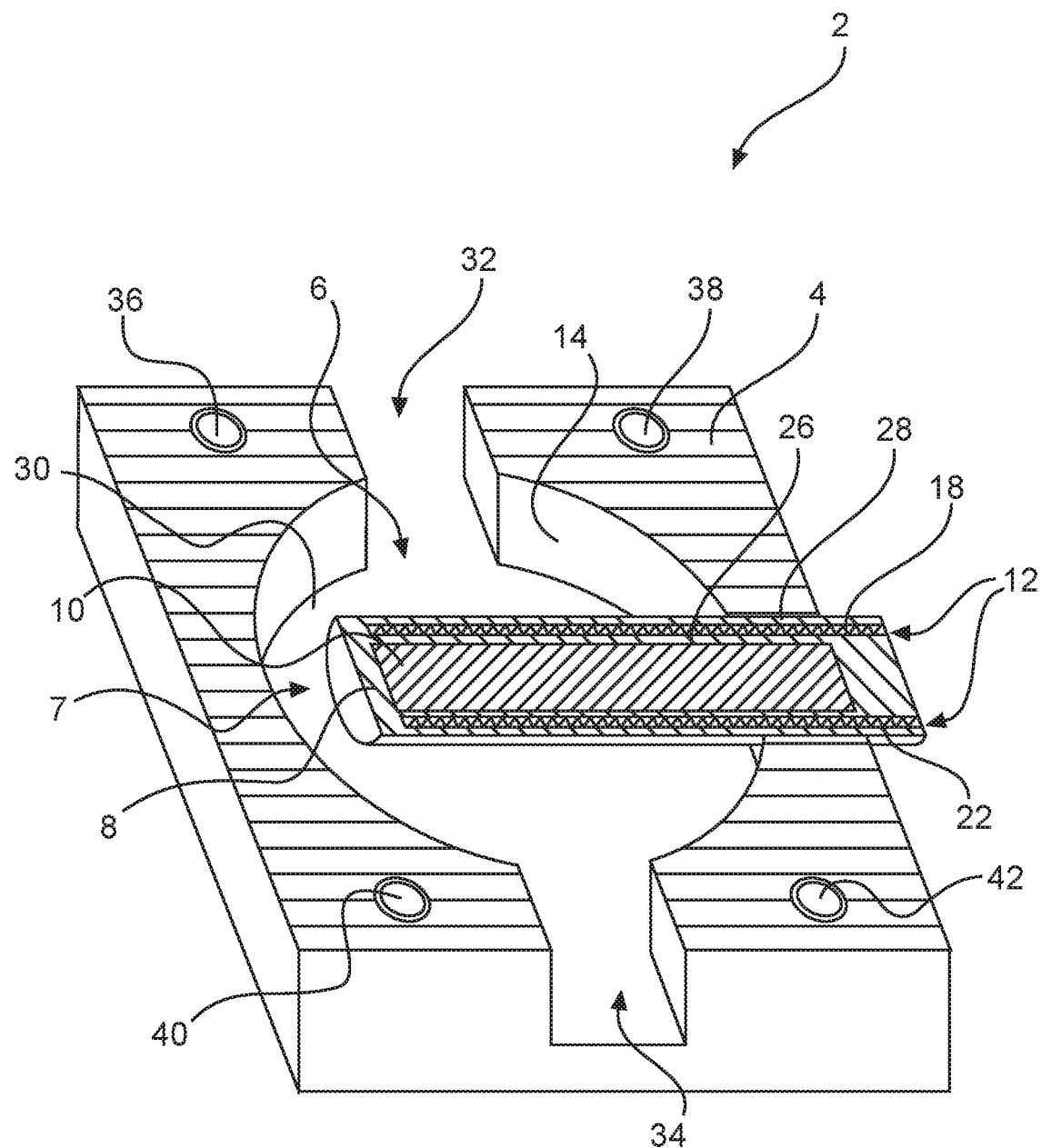
FIG. 1 shows a perspective sectional view of a resonator according to an exemplary embodiment.

FIG. 1 shows a perspective sectional representation of a resonator 2 according to an exemplary embodiment. The sectional representation is chosen here such that the resonator has been cut approximately vertically through the middle. However, the representation is only schematic and serves for explaining the design of the resonator 2.

The resonator 2 shown in FIG. 1 has a resonator housing 4, which has therein a resonator space 6, in which it is intended that the resonant frequency can be set. In the case of the exemplary embodiment shown, the resonator space 6 is delimited by a bottom surface 30 and is in addition of such a construction, note that the upper end of the resonator space 6 can be closed by a suitable cover (not shown). Provided for such a cover in the resonator housing 4 are a number of threaded bores 36, 38, 40, 42, in which mounting screws for fastening the cover on the resonator housing 4 can be accommodated. Furthermore, in the exemplary embodiment shown, the resonator space 6 is delimited by a cylindrical inner wall 14, which extends around the resonator space 6 and is merely interrupted by two apertures 32, 34. These two apertures 32, 34 make the resonator 2 according to the exemplary embodiment shown here suitable for use in a filter. However, it should be mentioned in this connection that the construction of the resonator housing 4 is not restricted to the construction shown here. Depending on the area of use of the resonator, the resonator housing may also be formed without the apertures 32 and 34 and in a different form. To put it another way, the resonator space does not have to be formed substantially cylindrically, as shown for example in FIG. 1.

In order to be able to set the resonant frequency of the resonator 2, the resonator 2 according to the present exemplary embodiment has an electrically adjustable dielectric 7, which in the case described is provided in the form of a container 8, in which a liquid crystal 10 is contained. In the exemplary embodiment shown, the container 8 is formed as a rod. To put it another way, the container 8 has an outer form which is shaped in the manner of a straight circular cylinder. Furthermore, the container 8 is produced from a dielectric material.

As shown in FIG. 1, the container 8 extends in a substantially horizontal direction and in this case in particular parallel to the bottom surface 30 of the resonator housing 4. Furthermore, the container 8 is arranged such that it is oriented substantially perpendicularly to the direction of extent of the two apertures 32, 34. Accordingly, a longitudinal axis of the container 8 extends substantially perpendicularly to the direction of extent of the two apertures 32, 34 and parallel to the bottom surface 30 of the resonator housing 4. The longitudinal axis of the container 8 in this case coincides with an axis of a circular cylinder. In this case it should be noted that the container 8 does not have to be formed completely circular-cylindrically. Rather, the container 8 may also have for example on the right side in FIG. 1, that is to say outside the resonator housing 4, a form deviating from the form of a circular cylinder. Also, the container 8 does not have to be formed as a straight circular cylinder in the interior of the resonator housing 4, but may be of any conceivable form that ensures a function of the electrically adjustable dielectric 7.

In order to arrange the electrically adjustable dielectric 7 in the way described above, the resonator housing 4 has in the inner wall 14 an opening 28, in which the electrically adjustable dielectric 7, in particular the container 8, is fitted and fastened such that the front end of the electrically adjustable dielectric 7 projects from the inner wall 14 and protrudes into the interior space 6 of the resonator 2. The opening 28 has in this case a form that is formed in a way corresponding to the form of the outer circumference of the electrically adjustable dielectric 7 or of the container 8. In the embodiment shown, the opening 28 has a cylindrical shape with a circular cross-section, the axis of extent of the opening 28, like the axis of extent of the container 8, being oriented parallel to the bottom surface 30 and substantially perpendicularly to the axes of extent of the apertures 32, 34. Furthermore, the opening 28 is arranged at a predetermined distance from the bottom surface 30, whereby the container 8 with the construction shown in FIG. 1 is at a distance from the bottom surface 30. Although not represented in FIG. 1, the opening 28 is also arranged at a predetermined distance from an upper end of the inner wall 14, so that the electrically adjustable dielectric 7 or the container 8 is also arranged at a predetermined distance from the upper end of the resonator housing 4, and consequently at a predetermined distance from a cover (not shown) that is used for closing the resonator housing 4. Altogether, the container 8 consequently protrudes from the inner wall 14 into the resonator space 6 in such a way that the part of the container 8 that is located in the resonator space 6 is at a distance from at least the bottom surface 30 and the cover (not shown). Apart from the preferred construction last described, however, there may also be a different arrangement of the container in the resonator housing 4, as long as such an arrangement makes changing of the resonant frequency in the interior of the resonator 2 possible.

As also shown in FIG. 1, apart from the already described container 8, the electrically controllable dielectric 7 has the liquid crystal 10, which is contained in a cavity 26 of the container 8. The liquid crystal 10 can be activated by an electrical control field. To be more precise, the permittivity of the liquid crystal 10 can be influenced by applying an electrical field. The cavity 26 of the container 8 is formed at least in certain portions having a cylindrical shape with a circular cross-section. For example the cylinder axes of the container 8 and the cavity 26 may coincide. The container 8 consequently has at least in certain portions the form of a hollow cylinder.

For the sake of completeness, an electrode structure 12 with electrodes 18, 22 is shown herein. However, it is pointed out that the electrode structure and the electrical control field generated by it are not in a definitive functional relationship with the construction of the interior space (the cavity 26). The electrical control field may also be generated in a way other than that described herein, without having an influence on the filling and the functional principle of the compensation for varying temperatures.

FIG. 1 shows the construction of the cavity 26 of the container 8, without specifically showing the different filling of the two chambers. This is shown in detail with reference to the further figures. It goes without saying that the container from any of the following figures can be used with the resonator 2 from FIG. 1.

Figure 2:
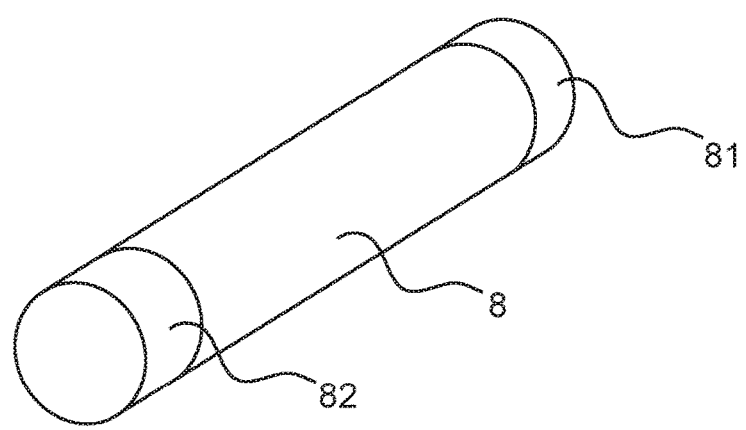
FIG. 2 shows a schematic representation of a container for a resonator according to an exemplary embodiment.

FIG. 2 shows a schematic isometric representation of the container 8. The container 8 is closed by a cover 81 and a cover 82. The two covers 81, 82 and the container 8 are preferably produced from the same material, in order to reduce stresses as a result of different coefficients of thermal expansion.

Figure 3:
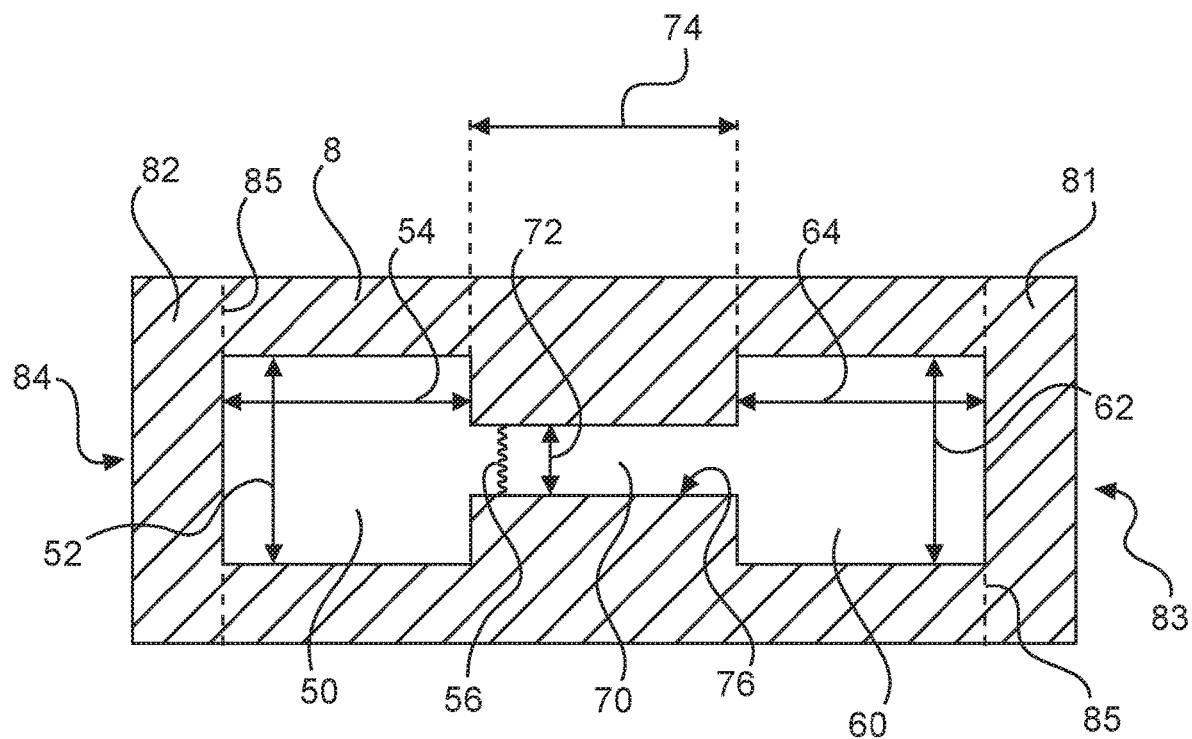
FIG. 3 shows a schematic sectional view of a container for a resonator according to an exemplary embodiment.

FIG. 3 shows a sectional representation of the container 8 from FIG. 2. The container 8 is closed at a first end face 84 by the first cover 82 and at a second end face 83 by the second cover 81. An adhesive connection 85 connects each of the two covers 81, 82 to the body of the container 8, so that a first chamber 50 and a second chamber 60 are closed in a fluid-tight manner by the covers 81, 82.

The cavity 26 (FIG. 1), that is to say the interior space of the container 8, consists of the first chamber 50, a connecting channel 70 and the second chamber 60. A liquid crystal is arranged in the first chamber 50 and in the second chamber 60 there is a gas, for example air. Depending on the volume of the liquid crystal, a surface level 56 of the liquid crystal in the connecting channel 70 migrates between the first chamber and the second chamber. If the liquid crystal expands, the surface level migrates to the right in the direction of the second chamber 60. If the liquid crystal contracts, the surface level migrates to the left. The gas in the second chamber is compressible and compensates for expansions of the liquid crystal.

The first chamber 50 has a length 54 and a width or diameter 52. The length 54 and the width 52 may be for example 2 mm. The outside diameter of the container 8 may be for example 4 mm. The connecting channel 70 may have a diameter 72 of 0.5 mm and a length 74 of 2 to 5 mm. The longer the connecting channel is, the greater the temperature range that can be compensated, because a greater expansion of the volume of the liquid crystal can be compensated. The second chamber 60 has a length 64 of 2.5 mm and a width 62 of 2 mm.

The filling level of the liquid crystal is set such that the surface level 56 at the lowest expected temperature is still in the connecting channel (and not in the first chamber 50) and at the highest expected temperature is also still in the connecting channel (and not in the second chamber 60).

For example, the first chamber may be filled with liquid crystal at a temperature that is midway between the lowest and highest expected temperature. Then, a quantity of liquid crystal is filled into the first chamber and the connecting channel such that the surface level lies half way up the connecting channel 70 between the first and second chambers 50, 60.

In this exemplary embodiment, the connecting channel 70 has a smaller cross-sectional area and a smaller diameter than each of the two chambers 50, 60. Among the effects achieved by this is that the surface level 56 is kept as a closed surface, so that the liquid crystal does not mix with the gas.

The assembly of the container is described by way of example on the basis of FIG. 2:

The two covers 81, 82 are disc-shaped. First, one of the two covers may be adhesively attached to the body of the container, in order to close a chamber 50, 60 on one side. Then, the closed chamber is filled with liquid crystal such that the surface level is approximately midway up the connecting channel. The filling with liquid crystal may take place with a long and thin syringe, which is inserted through the connecting channel into the lower chamber (which is closed on one side). When filling under atmospheric conditions on Earth, the second chamber is filled with air. However, the filling may also be performed under a shielding atmosphere; then the second chamber is filled with the corresponding gas or gas mixture. Then, the second cover is adhesively attached to the body. Since the adhered surface on the body of the container is far away from the surface level, the adhered surface can be cleaned well and a reliable adhesive attachment can be achieved. As a result of wetting and surface tension, the liquid crystal forms a simply closed volume and no parts of the liquid crystal flow through the connecting channel into the chamber intended for the air.

In the example shown, the volumes of the chambers and the connecting channel are designed such that the changing height of the level of the liquid crystal over a typical temperature range for a satellite application (for example −35° C. to +85° C.) is just a few mm. The level of the liquid crystal always stays in the thinner connecting channel without reaching the chamber filled with air. The change in pressure in the container 8 remains small, because the compressibility of the air is suitable for largely allowing for the temperature-dependent change in the volume of the liquid crystal. The change in pressure in the vessel in accordance with the temperature is much less than 1 bar, and consequently does not represent any danger to the vessel itself or to the adhesive attachment of the two covers.

The container 8 may be produced from a solid cylinder, by using a drill with a corresponding diameter first to produce the first chamber 50 and the second chamber 60 from the two end faces. Then a drill with a smaller diameter can be used for producing the connecting channel.

Figure 4:
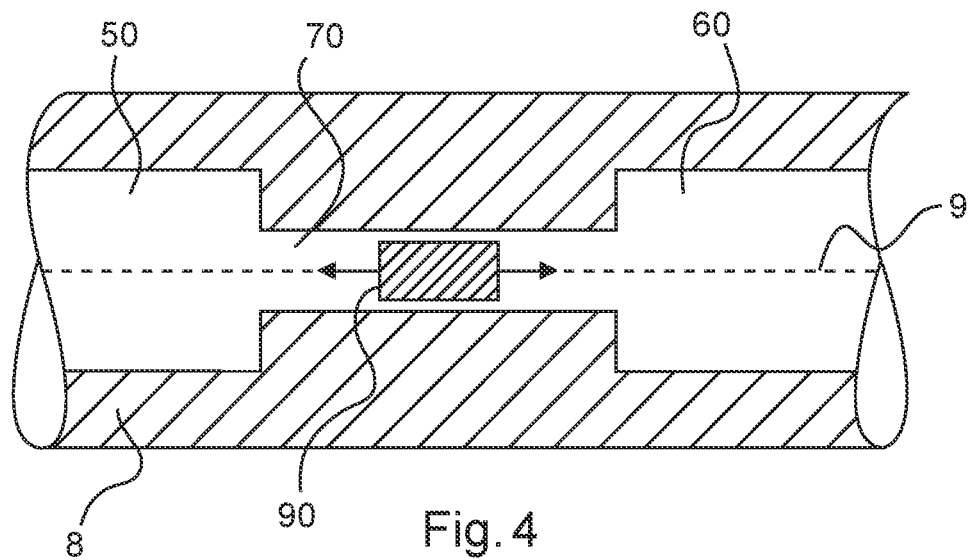
FIG. 4 shows a schematic sectional view of a container for a resonator according to an exemplary embodiment.

Building on FIG. 3, FIG. 4 shows an alternative exemplary embodiment of a dielectric element. A movable separating element 90 may be arranged in the connecting channel 70. The separating element 90 is movable in the longitudinal direction in the directions indicated by the two arrows along a longitudinal axis 9 of the container 8.

In this exemplary embodiment, first the first chamber 50 may be closed with the associated cover and filled with liquid crystal. This can be done in particular at a very high temperature, so that the surface level of the liquid crystal in the connecting channel is near the second chamber 60. Then, the separating element 90 is placed onto the surface level. When the liquid crystal cools down, the surface level moves in the direction of the first chamber 50 and draws the separating element 90 with it. The second chamber 60 can then be closed with the associated cover when the separating element 90 is in the middle of the connecting channel.

The separating element 90 may be of such a size that the separating element terminates in a fluid-tight manner with the inner wall of the connecting channel. For example, the separating element 90 may have a sealing coating. The separating element 90 may contribute to avoiding any mixing of the liquid crystal and the gas.

Figure 5:
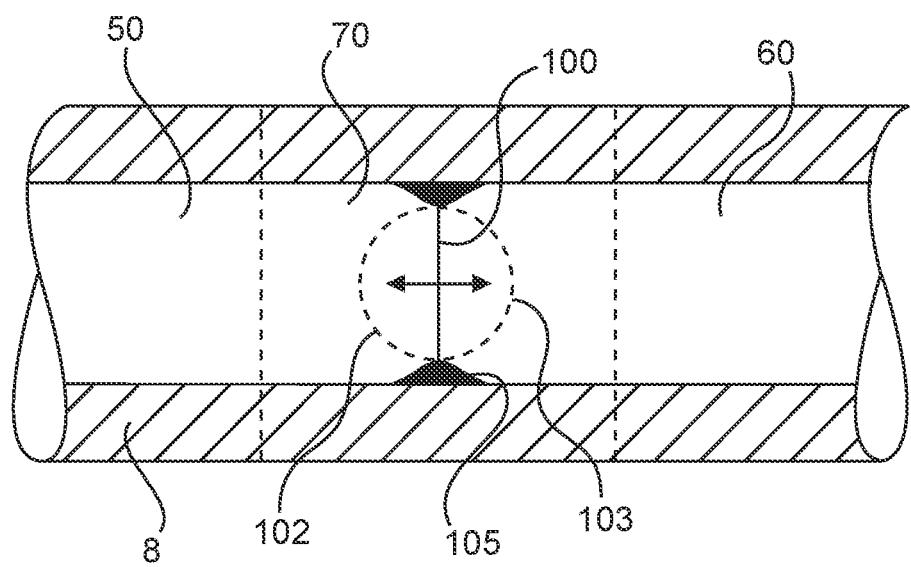
FIG. 5 shows a schematic sectional view of a container for a resonator according to an exemplary embodiment.

Building on FIG. 3, FIG. 5 shows an alternative exemplary embodiment of a dielectric element. A fluid-tight and elastic membrane 100 may be arranged in the connecting channel 70 in order to be able to compensate for changes in the volume of the liquid crystal. In the first chamber 50 and the portion of the connecting channel to the left of the membrane 100 there is exclusively liquid crystal. In the second chamber 60 and the portion of the connecting channel to the right of the membrane 100 there is a compressible gas. If the liquid crystal expands, the membrane can give way to the right in the direction of the second chamber 60, and thereby compress the gas. This state is indicated by the dashed line 103. If the liquid crystal contracts, the membrane moves to the left in the direction of the first chamber 50, and thereby allows the gas to expand in order to compensate for a smaller volume of the liquid crystal. This state is indicated by the dashed line 102.

The membrane is fastened circumferentially on inner surface 76 (FIG. 3) of the connecting channel at a connecting point 105. This may be for example an adhesive attachment. Clamping connections or frictional connections are likewise conceivable.

In the example of FIG. 5 it is not necessary (but nevertheless possible) that the connecting channel has a smaller cross-sectional area than the first and/or second chamber of the container 8.

Figure 6:
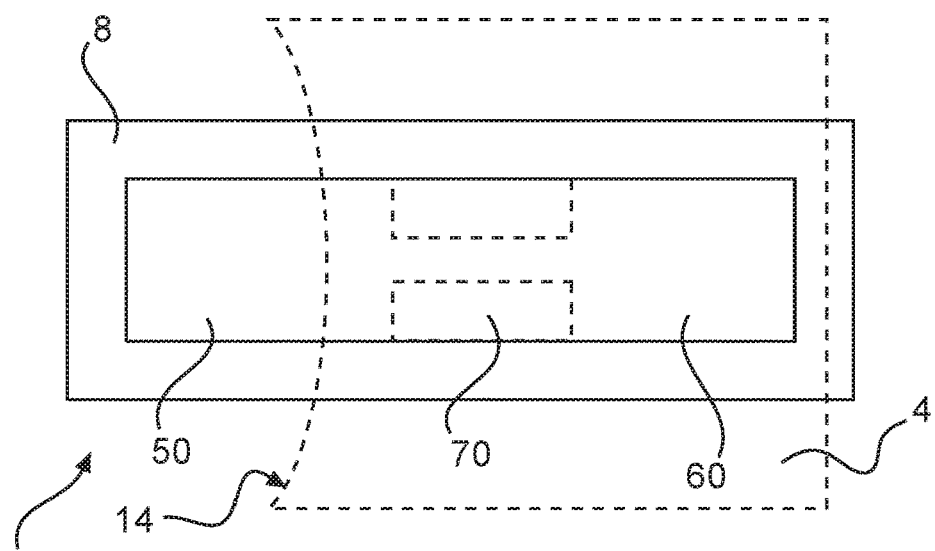
FIG. 6 shows a schematic representation of a resonator according to an exemplary embodiment.

With reference to and building on FIG. 1, FIG. 6 indicates the relative arrangement of the container 8 and of the resonator housing 4. The container 8 is represented with respect to the resonator housing 4 (depicted by dashed lines) and has been positioned into the resonator space to such an extent that only the first chamber 50 with liquid crystal is arranged within the inner wall 14. Both the connecting channel 70 and the second chamber 60 are arranged outside the resonator space 6. Consequently, a portion of the container in which there may be gas is not under any circumstances located within the inner wall 14 in the resonator space 6. As an alternative to this design, it is of course also possible that part of the connecting channel protrudes into the resonator space 6, as long as this part of the connecting channel is filled with liquid crystal at every operating temperature, in particular at the lowest operating temperature to be expected.

The container 8 is arranged with respect to the resonator space 6 such that a portion of the container 8 protrudes into the resonator space 6 (this is the portion to the left of the inner wall 14). A further portion of the container 8 extends through the resonator housing 4 (this is the portion to the right of the inner wall 14 and runs in the wall). In other words, the portion of the container filled with gas is always outside the resonator space 6.

Figure 7:
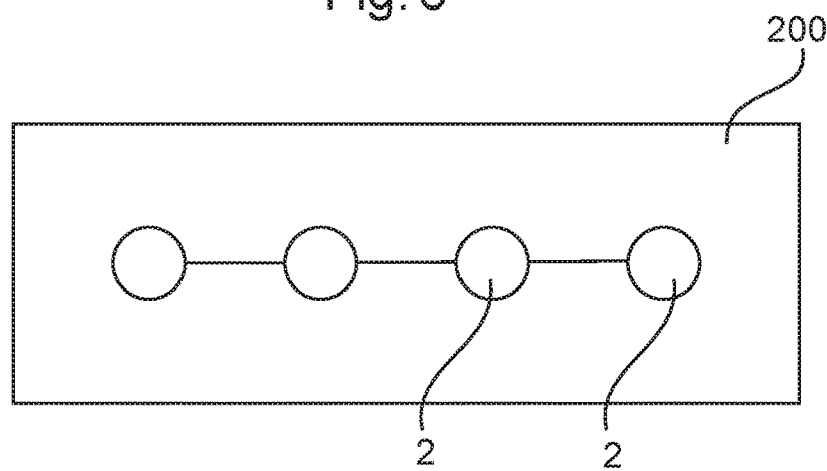
FIG. 7 shows a schematic representation of a frequency filter according to an exemplary embodiment.

FIG. 7 shows a schematic representation of a frequency filter 200. The filter 200 has a number of resonators 2 connected in series. Each resonator 2 may have been set to an individual resonant frequency. Such a filter 200 can be used in a transmission path of a communications satellite. In this case, the communications satellite may be assembled on Earth, then brought into an orbit around Earth, in particular outside the Earth's atmosphere, and operated there.

Figure 8:
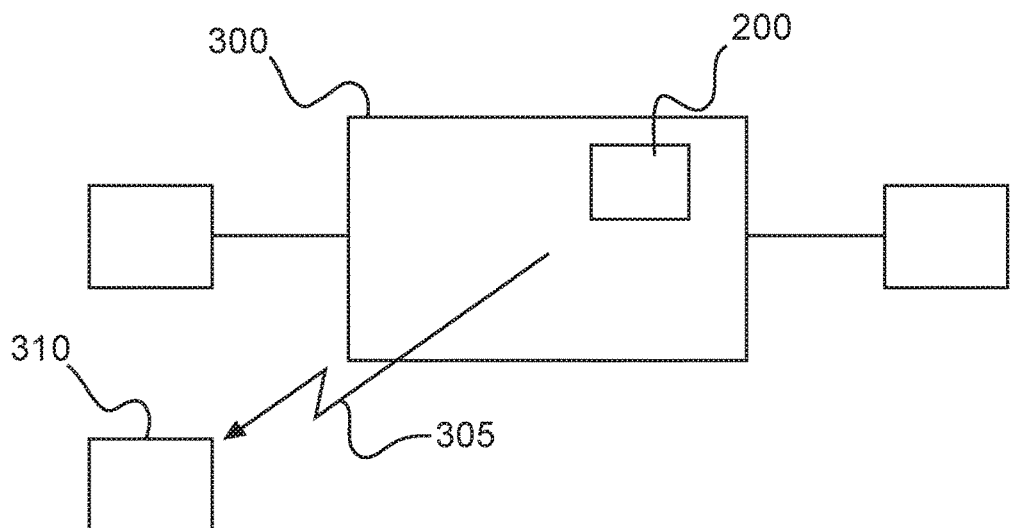
FIG. 8 shows a schematic representation of a satellite according to an exemplary embodiment.

FIG. 8 shows a satellite 300 with a frequency filter 200. The frequency filter 200 is used to adapt signals of a transmission link 305, in particular of a wireless radio link. The transmission link 305 establishes a connection between the satellite 300 and the remote station 310.

It is additionally pointed out that "having" or "comprising" does not rule out other elements or steps, and "a" or "an" does not rule out a multiplicity. It is also pointed out that features or steps that have been described with reference to one of the above exemplary embodiments or designs may also be used in combination with other features or steps of other exemplary embodiments or designs described above. Reference designations in the claims are not to be regarded as restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE DESIGNATIONS

2 Resonator
4 Resonator housing
6 Resonator space
7 Dielectric element, adjustable dielectric
8 Container
9 Longitudinal axis
10 Liquid crystal
12 Electrode structure
14 Inner wall
18 Electrode
22 Electrode
26 Cavity
28 Opening
30 Bottom surface
32 Aperture
34 Aperture
36 Threaded bore
38 Threaded bore
40 Threaded bore
42 Threaded bore
50 First chamber
54 Diameter, width
56 Length
60 Surface level of the liquid crystal
62 Second chamber
64 Diameter, width
70 Length
72 Connecting channel
74 Diameter, width
76 Length
81 Inner surface
82 Second cover
83 First cover
84 Second end face 85 First end face
90 Adhesive connection
100 Separating element
100 Membrane
102 State at lowest temperature
103 State at highest temperature
105 Connecting point
200 Filter
300 Satellite

The invention claimed is:

1. A dielectric element for adapting the resonant frequency of a resonator, the dielectric element comprising:
a container with a first chamber, a second chamber, and a connecting channel fluidically connecting the first chamber to the second chamber,
wherein the first chamber is filled with a liquid crystal such that a surface level of the liquid crystal is located in the connecting channel, and
wherein the second chamber is filled with a gas, so that, when there is a temperature-induced change in the volume of the liquid crystal, the surface level in the connecting channel moves in the direction of the second chamber or away from the second chamber.

2. The dielectric element according to claim 1, wherein a coefficient of thermal expansion of the liquid crystal is higher than a coefficient of thermal expansion of the container, so that the temperature-induced change in the volume of the liquid crystal is compensated by a change in the volume of the gas.

3. The dielectric element according to claim 1, wherein the connecting channel has a smaller cross section than a cross-section of the first chamber and a smaller cross section than a cross-section of the second chamber.

4. The dielectric element according to claim 3, wherein a volume of the connecting channel is smaller than a volume of the first chamber and smaller than a volume of the second chamber.

5. The dielectric element according to claim 1, further comprising a separating element, which is movable along a longitudinal axis of the container in the connecting channel and is arranged between the liquid crystal and the gas, arranged in the connecting channel.

6. The dielectric element according to claim 1, further comprising:
a membrane arranged in the connecting channel and connected in a fluid-tight manner to an inner surface of the connecting channel,
wherein the membrane comprises a fluid-impermeable and elastic material and is adjacent to the surface level of the liquid crystal, so that the membrane compensates for a temperature-induced change in the volume of the liquid crystal by a movement in the connecting channel in the direction of the second chamber or away from the second chamber.

7. The dielectric element according to claim 1,
wherein the first chamber is closed at a first end face of the container by a first cover, and
wherein the second chamber is closed at a second end face of the container by a second cover.

8. The dielectric element according to claim 7, wherein both the first cover and the second cover are adhesively bonded to the container.

9. The dielectric element according to claim 1, wherein the gas in the second chamber is air.

10. A resonator for a frequency filter, the resonator comprising:
a resonator housing, in which a resonator space is formed; and
the dielectric element according to claim 1 arranged such that the container is at least partially arranged in the resonator space.

11. The resonator according to claim 10,
wherein the container is formed as a rod and is arranged in the resonator housing such that the container protrudes from an inner wall of the resonator housing into the resonator space, and
wherein the connecting channel and the second chamber are located outside the resonator space.

12. A frequency filter comprising at least one resonator according to claim 10.

13. A satellite comprising at least one frequency filter according to claim 12.

14. The satellite according to claim 13, wherein the satellite is a communications satellite and the frequency filter is arranged in a transmission link to a remote station.

* * * * *